Aug. 10, 1937.  G. B. LINDERMAN, JR  2,089,701
METHOD AND APPARATUS FOR REMOTE INDICATION
Filed Aug. 14, 1933  6 Sheets-Sheet 1

Inventor
GARRETT B. LINDERMAN JR.

Strauch & Hoffman
Attorneys

Aug. 10, 1937.                    G. B. LINDERMAN, JR                    2,089,701
                    METHOD AND APPARATUS FOR REMOTE INDICATION
                        Filed Aug. 14, 1933          6 Sheets-Sheet 3

Inventor
GARRETT B. LINDERMAN JR.

Strauch & Hoffman
Attorneys

Aug. 10, 1937.   G. B. LINDERMAN, JR   2,089,701
METHOD AND APPARATUS FOR REMOTE INDICATION
Filed Aug. 14, 1933   6 Sheets-Sheet 4

Inventor
GARRETT B. LINDERMAN JR
Strauch & Hoffman
Attorneys

Aug. 10, 1937.   G. B. LINDERMAN, JR   2,089,701
METHOD AND APPARATUS FOR REMOTE INDICATION
Filed Aug. 14, 1933   6 Sheets-Sheet 5

Inventor
GARRETT B. LINDERMAN JR.
Strauch & Hoffman
Attorneys

Aug. 10, 1937.    G. B. LINDERMAN, JR    2,089,701
METHOD AND APPARATUS FOR REMOTE INDICATION
Filed Aug. 14, 1933    6 Sheets-Sheet 6

Inventor
GARRETT B. LINDERMAN JR.

Strauch & Hoffman
Attorneys

Patented Aug. 10, 1937

2,089,701

UNITED STATES PATENT OFFICE 2,089,701

METHOD AND APPARATUS FOR REMOTE INDICATION

Garrett B. Linderman, Jr., Pittsburgh, Pa., assignor to Pittsburgh Equitable Meter Company, Pittsburgh, Pa., a corporation of Pennsylvania Application August 14, 1933, Serial No. 685,137

3 Claims. (Cl. 177—351)

This invention relates to apparatus for accurately indicating or recording a variable quantity, motion or factor.

More particularly the invention relates to apparatus for indicating or recording at a distance the movement of an exploring device, such as a float, in major linear units and fractional units or fractions of the major unit with such a degree of precision as to be acceptable as a basis for computing charges or other commercial data.

The present invention is especially applicable to the measurement of the level of liquid in a storage reservoir or a vessel such as a tank, as for example, in the petroleum industry, where tanks many feet in diameter are used for storing crude oil or refinery products. It is essential that the level of liquid in the tank be determined accurately to account for loss by waste, evaporation or through other sources of loss, and where the cost or value of the liquid added to or withdrawn from the tank is computed from the difference in level of the liquid, it is important to accurately measure the level of the liquid. The practice in oil industry has been to send men out provided with gas masks to manually gauge tanks holding petroleum or refinery products, and because of the hazardous nature of this operation, two men are employed at the work to minimize the danger of a fatal accident in the event that one of the men is asphyxiated in the course of making the measurements.

Proposed telemetric systems of the prior art rely upon a single transmission device precluding the possibility of obtaining the necessary degree of accuracy for measuring valuable fluids with any form of receiver. Where unit and fractional unit transmission means have been employed, transmission of varying electrical currents has been relied upon to operate indicating instruments. Such prior art systems do not give results which are sufficiently accurate for the purpose outlined above as an example of an important field of use to which my invention is especially applicable. I have discovered that extremely accurate results not heretofore obtainable may be realized by combining in a novel manner, unit and fractional unit transmission means in a system using a zero deflection or null method of measurement.

For measuring the level of a liquid in a tank at a place remote therefrom, the present invention embodies a variable electrical function, as for example, a resistance, governed by the height of liquid in the tank, which forms part of a balancing circuit, containing a similar electrical function, and having means for measuring the function in large units. For determining a fraction of a large unit accurately a second similar electrical function varied by the first function at a different rate is employed, and by introducing this second function into a balancing circuit, which may be the same balancing circuit above mentioned, and providing means calibrated in small units, the large units and fractional large units can be accurately measured when a condition of balance is reached or recorded when the condition of balance is maintained.

Accordingly, one object of the present invention resides in the provision of apparatus for indicating or recording the level of liquid in a tank or other container in large and small units or large units and fractions thereof with extreme accuracy.

A further object of the present invention is to provide an apparatus for indicating or recording the level of liquid in a tank or other receptacle in large and small units, or large units and fractions thereof with extreme accuracy at a point remote therefrom over a single existing commercial communication channel with a single indicator or recording receiver.

A further object therefore resides in the provision of a system including a pair of variable electrical functions and a null system for determining said functions under conditions of balance in the system.

A further object of this invention is the provision of separate means for indicating or recording an unknown quantity at a distance, said means being controlled by the same factor but whose responses are unlike yet proportionally related, one means operating to indicate large units and another means which may comprise a part of the first mentioned means operating to indicate fractions of the large units whereby readings may be obtained to a high degree of accuracy.

A further object of this invention is the provision of separate means for remotely indicating an unknown quantity, the means being controlled by the same factor but responding differently thereto in a definite proportioned relation whereby the unknown quantity is accurately indicated in definite linear units and fractions thereof.

Still a further object of this invention is the provision of a multiple transmission apparatus to obtain accurate readings in different linear units proportional to the movement of different elements of the apparatus.

A further object of this invention is the provision in a remote indicator system of separate means controlled by the same factor but whose responses are unlike, in combination with a null system for determining the value of the responses to obtain a desired reading.

A further object of this invention is the provision in a remote indicator system of separate transmission means controlled by the same factor but responding differently thereto in a predetermined proportional relation, means being provided for selective connection with said separate transmission means to determine the value of each response, by balancing conditions in the different means.

A further object of this invention is the provision in a remote indicator system of separate transmission means controlled by the same factor but responding differently thereto in a predetermined proportional relation and measuring means for selective connection with the separate transmission means having a plurality of indicators, the indicator corresponding to the connected transmitting means only being readable for the purpose of avoiding mistakes in measuring the response of the transmission means.

A still further object of this invention is the provision of a system and apparatus for accurately measuring at a remote point a varying quantity in large and small or fractional units with a single receiver and a two element transmitter connection of either element of the transmitter to the receiver being controlled remotely over the circuit which is used for transmission of measurements of the varying quantity.

A still further object of the present invention is to provide a novel measuring means including a plurality of graduated scales, one only of which is visible at a time.

Still a further object is to provide a multiple transmitter containing two or more elements for indicating an unknown value, the elements of the transmitter being geared to move in a predetermined relation whereby when controlled by the same factor they will give unlike yet proportionally predetermined responses, means being provided whereby each transmitter may be connected thereto individually and the value of its response accurately determined.

A further object of this invention is the provision of means in connection with individual transmission elements whereby the response of either of said elements may be utilized to determine an unknown value.

A further object is the provision of means in connection with individual transmission elements whereby at least one element is maintained in responsive relation when another element is incapable of response.

Still a further object is the provision of means in connection with synchronized transmission elements which are arranged so as to be incapable of response at certain stages whereby one element is brought into responsive relation as another element approaches its non-responsive stage, thereby maintaining at least one of said elements in responsive relation.

These and other objects will be apparent from a consideration of the following description taken in connection with the accompanying drawings, wherein.

The invention will be hereinafter described as being particularly applicable to the accurate measurement of the depth of liquid in a tank but while I have chosen to illustrate and describe my invention in connection with this particular use, it is to be understood that the invention may be effectively practiced in connection with the measurement of any varying quantity and can be used to advantage for continuously recording variations in the quantity to be studied or measured.

Figures 1, 1B, 4:
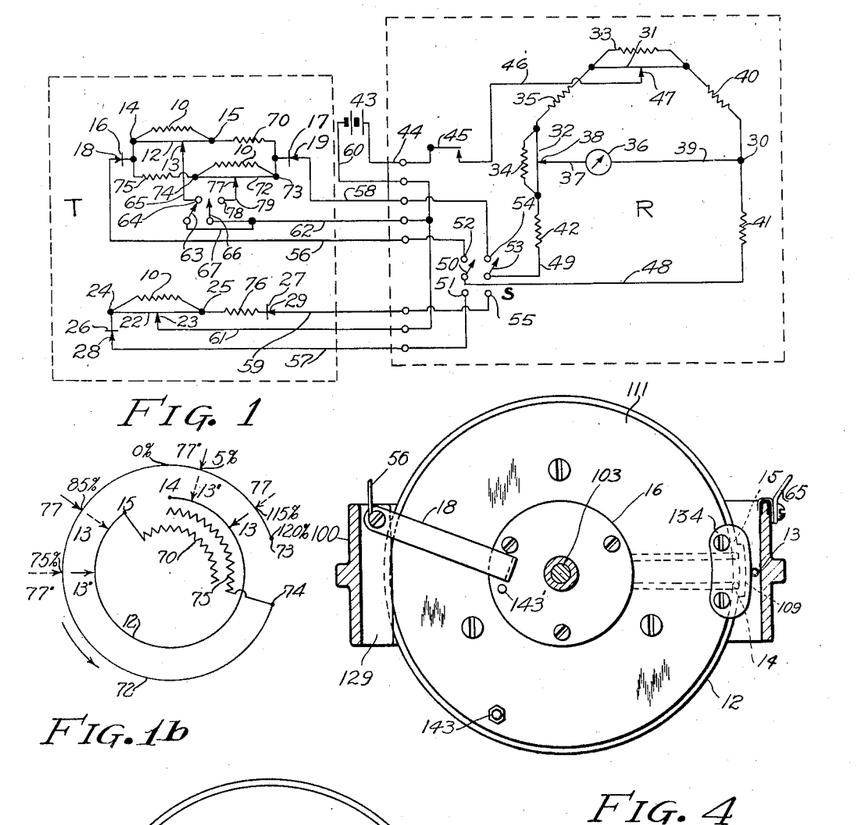
Figure 1 is a schematic diagram of an electrical circuit preferably employed in connection with the embodiment illustrated in Figure 2.
Figure 1b is a schematic diagram of the unit transmitter of Figures 2 to 6.
Figure 4 is a section taken on line IV—IV of Figure 2 to illustrate the manner of using the upper insulation disc.

Referring to the drawings in detail, and for the present particularly to Figure 1, the specific embodiment of the apparatus diagrammatically illustrated comprises a transmitter T, and a receiver R. The transmitter comprises a slide wire 12 across the ends of which is shunted a resistance 10 to accurately determine the total resistance of the wire between the ends 14 and 15. Preferably the wire 12 is in practice mounted upon a rotatable disc so as to slidably engage a fixed contact member 13, and the ends of the wire 12 are connected to metal contact rings 16 and 17 which rotate therewith. The contacts or brushes 18 and 19 make a sliding connection with the rings 16 and 17 respectively.

A second wire 22 is mounted on a suitable disc and is adapted to be rotated in a predetermined relation to the wire 12. For example, for each revolution of the wire 12 the wire 22 may make 1/60 of a revolution. The wire 22 likewise has a resistance 10 shunted across its ends 24 and 25 to accurately determine the total resistance of the wire between the ends 24 and 25. A similar contact member 23 makes sliding contact with the wire 22 intermediate its ends 24 and 25, which are connected to the metal rings 26 and 27 adapted to rotate therewith. Contacts or brushes 28 and 29 make similar sliding connection with the rings 26 and 27 respectively.

From the description so far pursued it will be apparent that the slide wire 12 is adapted to be moved or rotated in any suitable manner, as for example, by a float; and by suitable gearing, the wire 22 is rotated or moved at a slower rate. The contacts 13 and 23 will move along the wires 12 and 22 respectively to vary the effective resistance thereof, the effective resistance of wire 22 being varied only 1/50 that of wire 12. For example, the total resistance of wire 22 may represent the maximum range of the instrument, and if the level of a liquid is being measured this will correspond, for example, to 50 feet. The full resistance of wire 12 in such case will represent one foot. It will be seen that a difference in level of the liquid of one foot will cause the wire 12 to make a complete rotation whereas the wire 22 would make only 1/50 of a revolution, while, for example, a difference in level of five feet would cause the wire 12 to make 5 revolutions while wire 22 turns only one tenth of a revolution. The zero positions of the scales for wires 12 and 22 coincide on the receiver so that when the contact 23 is at exactly a foot division on wire 22 the contact 13 is at end 15 of wire 12.

The arrangement so far described comprises a two unit transmitter which may be used in conjunction with the receiver R a description of which follows. According to my invention I provide means for accurately measuring the position of contact 13 on the wire 12 in conjunction with means which eliminates the effect of the gap which necessarily exists between the ends 14 and 15 of wire 12, and these means will be described hereinafter in detail.

The preferred type of receiver now will be described. This consists of a modified Wheatstone bridge circuit comprising variable resistances 31 and 32 suitably shunted by the resistances 33 and 34 so that the total resistance across wire 32 is twice that across wire 31. A suitable resistance 35 is interposed between the ends of resistances 31 and 32. One terminal of the galvanometer 36 is connected by a wire 37 to a sliding contact 38 that moves along the wire 32, the other terminal being connected by a wire 39 in fixed relation at 30 between the ends of fixed equal resistances 40 and 41. A resistance 42 equal to resistance 35 is located adjacent wire 32. The battery 43 is connected through a lead 44, switch 45 and lead 46 to a movable contact member 47 which slidably engages the wire 31. The contacts 38 and 47 are adapted to be moved over their respective wires 32 and 31 in unison, and as one of these wires, namely 32, is twice the resistance of the other, it will be seen that the effective resistance of wire 32 changes twice as fast as that of wire 31.

The resistances 41 and 42 are connected by a double throw switch S manually operated to the ends of wires 12 or 22 as desired. For this purpose resistance 41 is connected by a lead wire 48 to a movable member 50 of a double switch which connects across the contacts 51 or 52, while a lead wire 49 connects resistance 42 to the member 53 of said double throw switch which connects across the contacts 54 or 55. Through the lead wires 56 and 58 the ends of wire 12 are connected to the switch contacts 52 and 54, while through the lead wires 57 and 59 the ends of wire 22 are similarly connected to the switch contacts 51 and 55. This switching arrangement permits the use of one receiver for indicating or measuring the effective resistance of each of wires 12 and 22.

The other terminal wire 60 of battery 43 is permanently connected to the lead wire 61 which in turn is connected to the sliding contact 23 of wire 22. Another lead wire 62 permanently connected to the lead wire 60 at one end is connected at its other end through the wire 67 to the movable switch member 63 which, as shown, contacts with the fixed switch terminal 64. A lead wire 65 connects this terminal to the sliding contact 13 on wire 12.

It will be apparent that in the modified Wheatstone bride circuit all the moving contacts are in the galvanometer or battery circuit where they cannot affect the accuracy of the measurement. In practice, the two slide wires 31 and 32 are mounted on a single disc and move in unison and the resistances 35 and 40 are so proportioned that at all points on the slide wires the resistance from 30 to 47 equals the resistance from 38 to 47 thus keeping the ratio arms of the bridge equal. As the disc is rotated the resistance through 42 to 38 varies, and as resistance 30 to 47 equals resistance 38 to 47, the bridge is balanced when resistance 38 to 53 equals resistance 30 to 50. With the leads 57 and 59 equal the variable resistance of slide wire 32 through 49 equals the effective resistance of slide wire 22. The total resistance of leads 49 and 59 equals the total resistance of 48 and 57 so that they do not affect the reading of the instrument. (Likewise leads 56 and 58 are equal.) The slide wire 32 therefore can be calibrated, or preferably, a calibrated scale can be attached thereto. In the present device two scales are employed one of which represents a foot and is subgraduated in inches and fractions of an inch, and the other of which represent a number of feet, for example 50 feet, and is graduated in feet and large fractions of a foot. The galvanometer 36 is employed to indicate a condition of balance that is, when the scale on wire 32 equals the effective resistance of wire 22.

The operation of the portion of Figure 1 so far described will be explained in connection with its use in a tank gauge, although it is to be understood the invention is not limited thereto. A variation in level of the liquid in the tank will move the contact 23 to a certain point along the wire 22, and the movable contact 13 likewise will be moved along the wire 12. However, because of the gearing between the wires 22 and 13, for each equivalent foot, i. e., 1/50 of its length, that wire 22 moves the wire 12 will move its entire length. If, for example, the contact 23 moves to a point on wire 22 that represents 10 feet 6± inches, the contact 13 will move to a point corresponding to the exact fractional foot, for example, 6.2 in. In order to read the gauge the switch members 50, 53 are thrown in contact with the terminals 51, 55, respectively, thereby bringing the wire 22 into the circuit. The effective resistance of wire 22 then becomes the distance 23 to 24, and by turning the disc carrying the slide wires 31 and 32 till the galvanometer shows zero deflection, the height of the liquid in feet will be shown on the foot scale. This, it has been assumed, is 10.5± ft. The switch members 50, 53 now are thrown in contact with the terminals 52, 54 respectively, thereby bringing the wire 12 into the circuit and cutting out the wire 22. The effective resistance of wire 12 now is the distance from 13 to 14, and by again turning the disc carrying the slide wires 31 and 32 till the galvanometer shows zero deflection the last fraction of the previous reading can be accurately read on the fractional foot scale. This reading will be 6.2 in. in accordance with the previous assumption so that the total reading becomes 10 ft. 6.2 in. instead of 10 feet 6± inches.

Since as previously referred to there must be a break between the two ends 14 and 15 of circular wire 12, when the wire is moved to the point at which contact 13 lies between the ends, the contact can make no connection, and therefore there could be no reading at this point.

This break, however small it may be made, causes a condition to arise where the precise reading is in doubt. With the two section transmitter illustrated, when the contact 13 lies at an end of the slide wire 12 the correct level is apparently a quantity which can be expressed in the large units without a fractional part. For example, with a transmitter using slide wires 12 and 22 as previously described, if the contact 23 bears on slide wire 22 at a point which represents 10 feet, and the contact 13 lies in the break between the ends 14 and 15 of wire 12, the reading will apparently be 10 feet. If, however, readings could be taken for the full 360 degrees of rotation of the disc carrying wire 12, a small fraction of an inch may be indicated as the amount which is to be added to or subtracted from the reading of 10 feet. Also, with a transmitter embodying slide wires 12 and 22, if a fault existed in the circuits connecting slide wire 12 to the receiver this would not be readily detected if readings in large units very close to even figures were obtained with switch S in contact with wire points 51 and 55.

Other disadvantages would arise if a recording receiver were employed using an automatic balancing scheme. If the transmitting slide wire 12 stopped with contact 13 in the open circuit position between the ends 14 and 15, the recording pen would produce an irregular record if the recorder galvanometer were under damped. Also if, due to the condition of the function being transmitted, the slide wire 12 should oscillate with the contact 13 near the break so that the contact 13 would come in contact alternately with ends 14 and 15, the recorder pen would move from one end of the scale to the other, producing a poor record.

The foregoing disadvantages are overcome by the arrangement now to be described:

The slide wire 12 has interposed between the end 15 and ring 17 a resistance 70 which is equal to one third the resistance between the ends 14 and 15. The disc which carries slide wire 12 also carries a slide wire 72 which is equal to slide wire 12 and is connected to the ring 17 at one end 73. A resistance similar to resistance 70 bridges the slide wire 72. A resistance 75 is interposed between the other end 74 and the ring 16, this resistance being equal to resistance 70. As the gearing ratio between slide wire 12 and wire 22 is 1/60th, and as it is desired to have the fractional unit transmitter indicate hundredths of a foot, the resistance 76 is connected to slide wire 22 to keep the total resistance of wires 22 and 76 equal to one half of wires 12 and 70.

Figure 1b shows diagrammatically the relative positions occupied by slide wires 12 and 72 when mounted in position in a transmitter. The structure of the mounting for the slide wires will be fully described later in connection with the description of a preferred form of transmitter illustrated by Figures 2 to 6 of the drawings employing the arrangement of Figures 1 and 1b. Referring to Figures 1 and 1b, the end 14 of slide wire 12 begins at a point corresponding to zero position of slide wire 22 and for each revolution of a given point on Figure 1b the slide wire 22 will rotate 1/60th of its length. A contact member 77 engages slide wire 72, and as shown by Figure 1b which illustrates the preferred relative positions of wires 12 and 72, the contact 77 is directly in line with contact 13 which engages wire 12. Slide wire 72 is displaced from slide wire 12 and begins at 30% of the circumference of the transmitter, that is, one-third the length of wire 12, and ends at about 120% of the circumference, and resistance 75 extends the range of this slide wire back one-third to the zero point. The range of slide wire 12 is extended to about 120% of the circumference by resistance 70 which as previously stated is one-third of the value of the resistance of wire 12 between the ends 14 and 15.

With the arrangement just described, it will be seen that there is an overlap in the range of these wires from zero to 20% of the circumference and contact 77 enables readings to be taken from about 90% of the circumference to over 100% of the circumference continuously and without interruption, while contact 13 permits readings to be taken from about zero to about 90% of the circumference so that the two contacts in combination will cover the entire unit range of the instrument and a small overlap without showing a dead space caused by the gaps between the ends of the wires. As will hereinafter appear, the fractional unit indicator or recorder will be calibrated from zero to twelve inches in black numerals corresponding to 100% revolution of wires 12 and 72, and a duplicate scale in red numerals from zero to two inches with the red zero coinciding with the black 12 will extend the receiver readings to correspond to the 20% overlap.

The contacts 13 and 77 are continually in contact with their respective wires, and a switch member is employed to shift the connection from one or the other in the circuit. This switch member is operated automatically and consists of a movable member 63 adapted to contact the switch contact 64 and a second movable member 66 connected by wire 67 thereto, and adapted to contact the switch contact 78, the latter being connected to contact 77 by a lead wire 79.

The principle of operation of the switch arrangement will now be described with reference to Figures 1 and 1b: For the sake of clearness of description, it will be assumed that slide wires 12 and 72 are stationary and that contacts 13 and 77 follow the wires by progressing in a clockwise direction around Figure 1b for an increase in the function to be measured, the arrow indicating the direction of movement of the slide wires. Starting with the zero position of the slide wire 22 or at an even foot position, contact 13 moves clockwise with an increase in the function to be measured to the position shown by dotted arrow 13. At an intermediate point indicated by the dotted arrow 77 as will be explained, contact 13 is connected into the circuit by switch 63. At the point indicated by dotted arrow 13, the switch 63 contacting point 64 (Figure 1) is opened and switch 66 is closed to introduce wire 72 and contact 77 into the circuit. This operation of the switch preferably occurs at about 85% of a revolution of the contacts as is indicated by the designation "85%" on Figure 1b. At this point the effective resistance of the wire 12 is from 14 to dotted line contact 13. In switching over to wire 72 the balance of the circuit is not upset because the effective resistance of wire 72 is from 74 to the point designated "85%" to which is added the resistance 75 which makes the resistance of the slide wires 12 and 72 equal from point 14 to dotted arrow 13.

Continued movement of the contacts 13 and 77 in a clockwise direction which is equivalent for the purpose of this description, to actual movement of slide wires 12 and 72 in a counterclockwise direction, brings these contacts to the position indicated by the dotted arrow 77 at a point corresponding to about 15% of a revolution, measuring from the zero position 14, at which point switch 66 is opened and switch member 63 is closed thereby switching wire 12 into the circuit again. At this point the effective resistance of wire 72 is from zero point 14, because of the effect of resistance 75, to dotted line contact 77 which corresponds to 115% of a full scale reading of the fractional transmitter. The effective resistance of the slide wire 12 at this point is only from zero point 14 to the full line arrow 13 which corresponds to only 15% of a full scale reading of slide wire 12. In switching over to wire 12 at this point the balance is upset. However, this is provided for by the scale of the receiver shown in Figure 7 as will hereinafter appear. Continued rotation in the same direction causes a repetition of the switch action just described.

When the direction of rotation is reversed by reason of a decrease in the function being measured, the slide wires 12 and 72 turn in a clockwise direction as viewed on Figure 1b. This is equivalent to a counterclockwise movement of contacts 13 and 77 and it will be assumed that these contacts follow the wires by progressing in a counterclockwise direction around Figure 1b for a decrease in the function to be measured. Again, as before, starting with a position of the slide wire 22 so that contact 13 is in contact with wire 12, upon a decrease in the function to be measured, contact 13 moves counterclockwise to the position indicated by dotted arrow 13'. At this time switch 63 operates to disconnect contact 13 and switch 66 is closed to introduce wire 72 and contact 77 into the circuit. This operation of the switch preferably occurs at about 5% of a revolution measuring clockwise around Figure 1b beginning at point 14 and it will be seen that the switch operation occurs near the point designated by dotted arrow 13'. In switching over to wire 72 the balance is upset for the reason previously considered in connection with the description of the switch action which occurs at dotted arrow 77 when the function to be measured is increasing in value.

Continued movement of the contacts 13 and 77 in the reverse direction with a decreasing value of the function being measured brings these contacts to a position indicated by dotted arrow 77', at a point corresponding to about 75% of a revolution as measured from point 14 in a clockwise direction around Figure 1b. At this point, switch 66 is opened and switch 63 is closed bringing contact 13 into the circuit. The balance of the circuit is not upset in switching over to the wire 12 at this point for the reason previously set forth in connection with the switch operation which occurs at the point indicated by dotted arrow 13. Continued rotation of the slide wires in a clockwise direction causes a repetition of the action just described.

It will be seen from the foregoing that on an increase in the function to be measured, the change from the slide wire 72 to the slide wire 12 is made at the point indicated by the dotted arrow 77 which is at 115% of a revolution, and that on a decrease in the function if slide wire 12 is originally in the circuit a shift occurs to the slide wire 72 at 5% of a revolution, and the change back to wire 12 occurs at 75% of a revolution. This range of approximately 10% of a revolution between shifting points is preferably provided so that if the liquid level varies when the contacts are near the shift points the oscillation near the transfer point will not cause repeated operation of the switches 63 and 66 with consequent jumping from one end of the scale to the other between the 5% and 115% points. The same range is provided between dotted arrow 13 to full line arrow 13' from 75% to 85%.

Figures 7, 15:
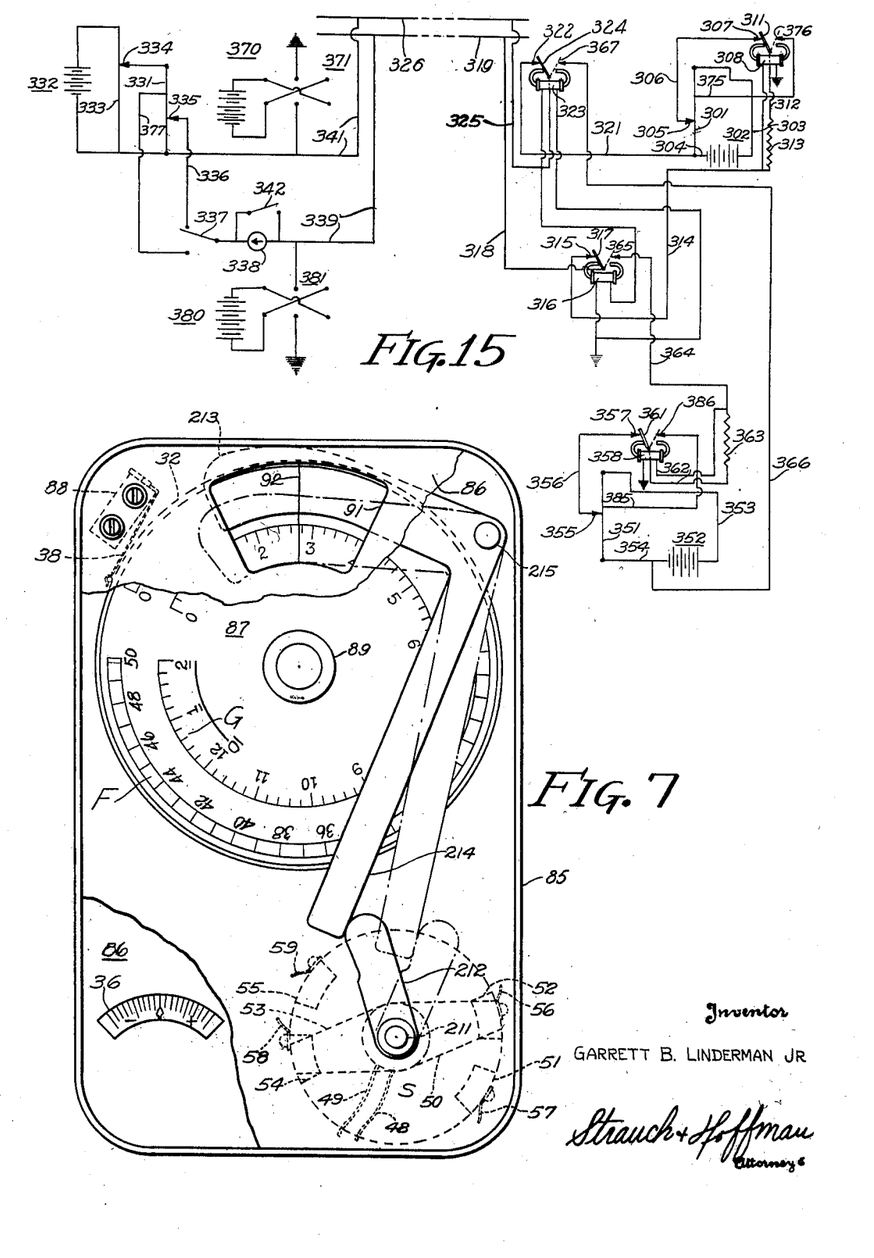
Figure 7 is a view, partly in section, of a receiver for use in connection with the modification shown in Figures 1 to 6.
Figure 15 is a schematic diagram of a modification employing a potentiometer circuit and suitable for use on telephone lines for long distance transmission.

The receiver as shown in Figure 7 comprises a case 85 having a cover 86 for supporting the working parts, the cover being shown broken away. The wire 32 and wire 31, the latter not being shown in Figure 7, are mounted side by side on the periphery of cylinder 87 so as to rotate in unison therewith. Cylinder or disc 87 is arranged to be turned slightly less than a full revolution. The spring contact member 38 mounted on a support 88 makes a sliding contact with wire 32. Contact member 47, not shown in Figure 7, is likewise secured to support 88 and contacts wire 31. The disc 87 may be rotated by means of knob 89, and as hereinbefore explained, as wire 32 is twice the resistance of wire 31, and as the wires 31 and 32 rotate in unison with the disc 87, the ratio arms of the bridge circuit are maintained equal. The disc 87 has near its periphery a scale F which rotates therewith and is graduated from zero to 50 feet corresponding to the full length of wire 22. A concentric scale G likewise secured on the disc 87 and rotatable therewith is graduated in inches from zero to twelve inches in black numerals then to two inches in red numerals with the black 12 and red zero at the same point, this full scale corresponding to about 120% of a revolution of wires 12 and 72, that is, to the combined overlapped lengths of said wires. The red scale therefore is a duplicate of a portion of the black scale. The cover 86 of the case has a suitable window 91 therein with a hair line 92 on the glass closure for reading the scales G and F. As the point on wire 72 opposite 14 represents 100% of a revolution this corresponds to twelve inches on the scale G, while the point 120% would correspond to 2.4 inches on the red scale were this scale extended far enough.

In order to take a reading at the receiver it is necessary to rotate disc 87 carrying wires 31 and 32 and scales F and G until the galvanometer 36 shows zero deflection. When wire 22 is connected to the receiver by switch S the scale F is to be read. To take the reading of wire 12 or 72 the switch S must be shifted to connect these wires to the receiver, and as the effective resistance of wire 12 or 72 is ordinarily not the same as the effective resistance of wire 22, this shifting of switch S upsets the balance of the receiving circuit so that the disc 87 again must be turned till the galvanometer shows zero deflection to take the reading on scale G. When the readings of scales F and G are hereinafter referred to the above procedure involving the proper connection of switch S and rotation of disc 87 for balancing of the galvanometer will be understood.

Referring again to Figures 1, 1b and 7, it will be seen that when slide wire 22 is at zero position at 24, the end 14 of wire 12 is likewise at zero position but is not connected in the circuit, but wire 72 with contact 77 opposite the zero position is in the circuit. In this position the scale F would indicate zero feet, and scale G would likewise indicate red zero inches at the red zero. If wire 22 now moves an amount equivalent to .15 foot the scale F will register plus zero feet and scale G will register 1.8 inches on the red scale so that the reading is exactly 1.8 inches. That is, the inch reading is always added to the last full foot reading of scale F. However, at this point the contact 77 will be at the position 77 shown in Figure 1b and with the toggle switch just ready to jump. Upon further turning of the slide wires the switch disconnects wire contact 77 and connects contact 13 thus unbalancing the circuit, and to restore the galvanometer to a position of balance to take a reading the disc 87 must be reversely rotated to the corresponding position on the black scale, that is, 1.8 inches plus at which point the reading is taken. Upon further turning of the slide wires the readings on both scales F and G will mount until the next full foot is passed and this action will be repeated. Hence it will be seen that upon balancing the receiver circuit if the reading on scale F is apparently a full foot division, the exact measurement can be obtained by connecting wires 12 and 72 into the receiver circuit through switch S and reading the measurement thereof on scale G. Whether the scale G reads in the red numerals above twelve or in the black scale the reading always is the nearest full foot indicated on scale F plus the reading on the scale G above the red or black zero as the case may be.

Once the switch action has taken place so that the scale G reads 1.8 inches plus in the black, if the direction of rotation of wires 22, 12 and 72 reverses due to a decrease in the liquid level the switch will not reverse at the 1.8 inch black reading. A ten per cent difference between switching points is provided, as previously explained in connection with the diagram of Figure 1b, and this permits readings to be taken until a position of balance of about .6 in. is reached (i. e. 5% of 12 in.) at which point the switch action reverses throwing wire 72 into the circuit. This unbalances the receiving circuit so that the scale G must now be shifted to the red to take a proper reading. It will be observed that as no unbalancing action occurs on the decline at 75% where the switch shifts from 77' to 12' or on the increase at 85% where the switch action shifts from 13 to 77, it is possible to take continuous readings over a range from .6 to 13.8 inches on scale G.

Figures 2, 6:
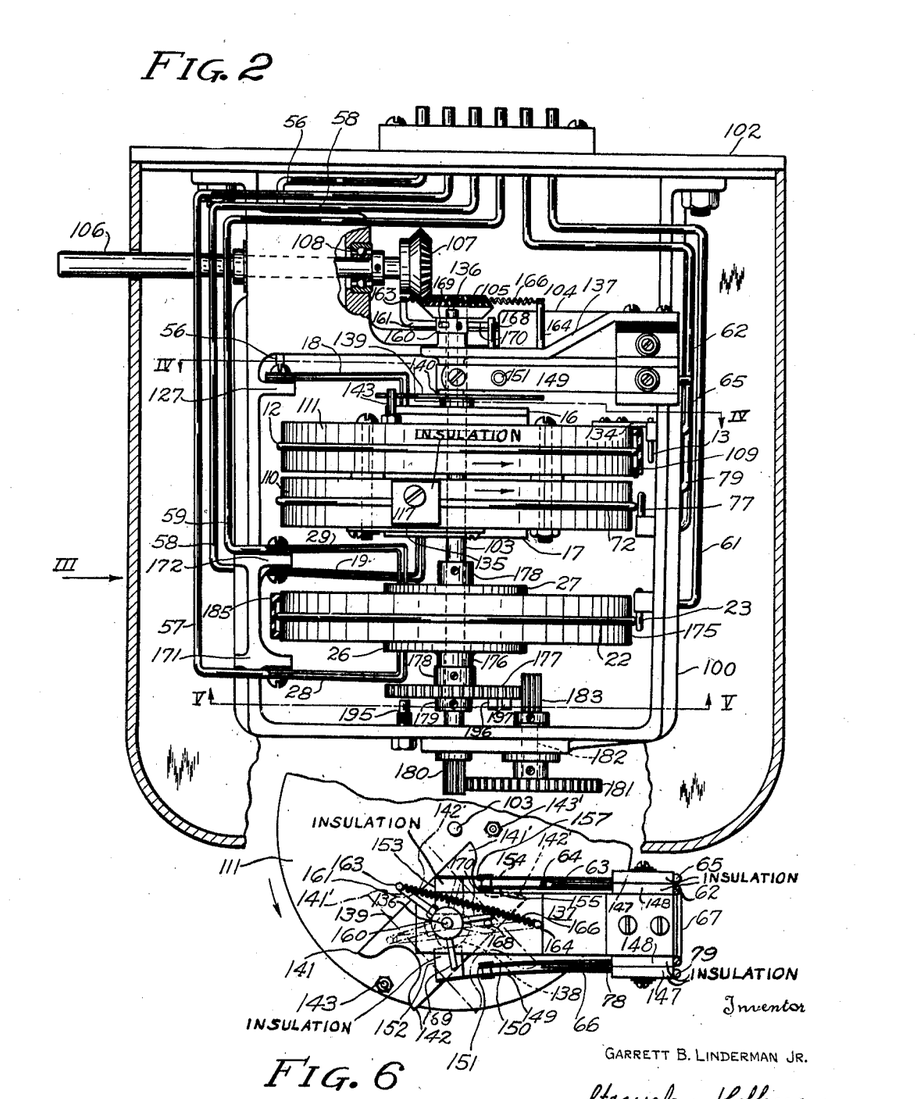
Figure 2 is an elevation of a preferred embodiment of the invention with the enclosing casing taken in section.
Figure 6 is a detailed view in plan of the switch mounted above the upper insulating disc in Figure 2.

Referring to Figure 2, which shows a preferred construction of the transmitter schematically illustrated in Figures 1 and 1b, the U-shaped frame 100 is adapted to be inserted into a box or enclosure having a top 102 in which the frame is secured, and the whole apparatus is adapted to be placed at or near the top of a tank above the level of liquid therein. A central shaft 103 extends through the frame and is journalled at one end in the bottom part of the frame and at the other end in a cross member 104 near the top of the frame, and has a bevel gear 105 suitably secured thereto at its upper end. The top of the frame has a thickened portion through which passes the shaft 106 having the bevel gear 107 suitably secured on its inner end and meshing with the bevel gear 105 whereby the shaft 103 may be rotated in unison therewith. Shaft 106 is adapted to be rotated by movement of a float on an endless belt (not shown) or other suitable element operated by the level of liquid in a tank (not shown). Preferably the shaft 106 is journalled in ball bearings 108 or other suitable antifriction bearings. It will be evident that if so desired the shaft 106 and gears 105 and 107 can be eliminated and shaft 103 can be extended so that it will be driven directly from the float member thereby eliminating possible play in the gearing arrangement shown.

Suitably secured on the shaft 103 to rotate therewith are the insulation discs 110 and 111 about the peripheries of which are wound the sliding resistance wires 12 and 12 respectively. Wire 12 is clamped in place at its end 14, 15 by the insulation plate 109 which is held on disc 111 in any suitable manner, and one end of the wire 12 passes through the disc 111 and contacts with a collector ring 16 secured to a face of the disc 111 in any suitable manner. The other end of the wire passes through the discs 111 and 110 and to a suitable auxiliary resistance 70 (Figures 1 and 1b) in the disc and to a collector ring 17 on the opposite side of the bottom disc 110. On the disc 110 the similarly wound sliding contact wire 72 has its end 74, 73 secured in a similar manner by the insulation plate 117 disposed at an angle of about 108° from the plate 109. The one end 74 of the wire 72 passes through the discs 110 and 111 and to a suitable auxiliary resistance 75 in the disc and to a collector ring 16, and the other end 73 of the wire 72 is secured to the collector ring 17. The resistances 70 and 75 are embedded in the discs 110 and 111.

Figure 3:
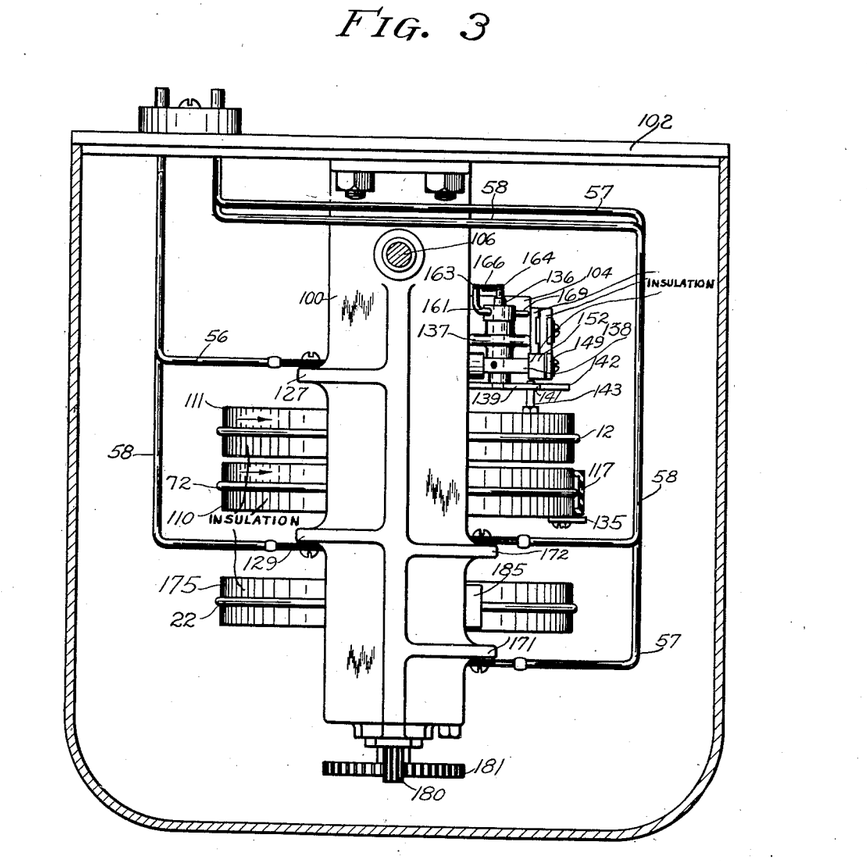
Figure 3 is an elevation of the embodiment illustrated in Figure 2, with the enclosing casing in section and taken at right angles to Figure 2 in the direction of the arrow III.
Figure 5:
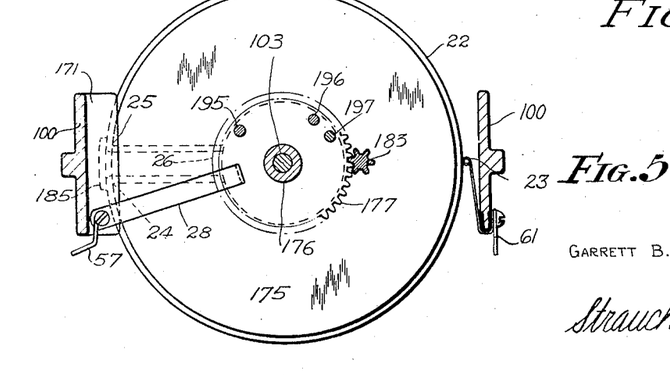
Figure 5 is a section taken on the line V—V of Figure 2 to illustrate the manner of wiring the lower insulation disc and a portion of the disc therefor.

A spring pressed brush member 18 is clamped at one end to a shelf 127 on the frame 100 and is insulated therefrom in any suitable manner, the other end of the brush member resiliently bearing on the collector ring 16 and making sliding electrical contact therewith at all times. A similar spring pressed brush member 19 on the shelf 129 (Figure 3) secured thereto and insulated therefrom in the same way makes sliding contact with the collector ring 17. Lead wires 56 and 58 are connected to the brush members 18 and 19 respectively at one end and to suitable binding posts at their other ends in the top 102.

The spring pressed sliding contacts 13 and 77 are secured to the frame 100 and insulated therefrom in any suitable manner, and make resilient sliding contact with the wires 12 and 72 respectively. A guard 134 is secured to one face of the disc 111 and projects over its edge adjacent plate 109, so that when the disc 111 is rotated to the position with the plate 109 opposite the contact 13 the guard 134 bears against the contact 13 and moves it out of engagement with the wire 12 while the contact 77 continues to bear on the wire 72 as shown in Figure 2. Now, as rotation of the discs is continued the guard 134 moves out of contact with the contact 13 permitting it to reengage the wire 12, the contact 77 in the meantime continuously engaging the wire 72 until the lower guard 135 under the plate 117 on disc 110 is brought around into contact with the contact 77 and moves it out of engagement with the wire 72, the contact 13 meanwhile continuously engaging the wire 12. Further rotary movement of the discs 111 and 110 brings the guard 135 out of engagement with the contact 77 which then again contacts wire 72. It will be seen, therefore, that both contacts 13 and 77 continuously engage their respective wires 12 and 72, except at the plates 109 and 117, and in order that current shall flow through only one contact at a time a special toggle switch is provided.

The toggle switch construction included in the present invention comprises a pivot rod or shaft 136 (Figures 2 and 6) rotatably secured in an extension 137 at the top of the main frame 100 and suitably insulated therefrom. On this shaft is secured an eccentric or cam shaped collar 138 adapted to rotate therewith. The switch operating bar 139 is suitably secured to the pivot shaft 136 as by a collar 140 integral therewith, and has both ends free, the ends being bifurcated as shown to form the tines 141, 142 and 141' and 142'. A pin 143 projecting from the face of the disc 111 is adapted to contact with either of the tines 141 or 142 depending on the direction of rotation to shift the bar 139 about the pivot shaft 136 turning the pivot therewith to the position as shown in dotted lines in Figure 6 when rotation is in the direction of the arrow.

As shown in Figure 6 the lead wire 65 is connected at one end with the contact 13 and at its other end is electrically connected with fixed spring switch member 64 secured to the frame 100 between insulation blocks 147 and 148. A movable switch member 63 is composed of two spring portions 154 and 155 secured together at 157, and the spring portion 155 carries at its end a bearing block 153 of insulation material which is adapted to ride on cam collar 138. In the position of the switch shown in Figure 6 the cam collar 138 holds the bearing block 153 lowered thus keeping switch member 63 out of contact with fixed spring switch member 64. In this position sliding contact 13 has been contacting wire 12 but the circuit through members 63 and 65 is not closed. Diametrically opposite to bearing block 153 is the similar bearing block 152 which is carried at the end of a spring portion 149 likewise secured to a spring member 150 at 151 to form a switch member 66, and between which extends the fixed spring switch member 78, all of which are similarly secured in insulation blocks. A lead wire 79 contacts at one end with the contact 77 and at its other end with fixed switch member 78. The movable switch member 63 and 66 are interconnected by a wire 67 so that in effect they form one movable switch. It will be apparent because of the shape of cam collar 138, when contact between switch elements 64 and 63 is broken, the contact between switch elements 66 and 78 is established as in the position of the switches shown in Figure 6 so that the current from only contact 77 and resistance 72 is conducted through switch elements 66 and 78 by wire 62 to the binding post in the top cover.

Upon rotation of the disc 111 in counterclockwise direction the pin 143 contacts tine 142, and continued rotation in the same direction moves switch bar 139 to the position shown by dotted lines in Figure 6, turning the cam 138 therewith. In this position the movable switch member 63 becomes bowed and contacts fixed switch member 64 by reason of the eccentric cam 138 moving it outward, while the other switch member 66 straightens and breaks contact with fixed switch member 78. Thus, wire 72 is removed from the circuit while wire 12 is placed in the circuit. This turn occurs substantially at the point indicated by the dotted arrow 77 on Figure 1b.

In order to return the switch bar 139 to its original position after this action, the opposite end of the switch bar has tines 141', 142' thereon, and a pin 143' is suitably secured on the disc 111 near its center. This pin 143' is located so that after the switch bar has moved to the position shown in dotted lines and disc 111 continues to rotate in the direction of the arrow till the contact 13 passes plate 117 it contacts the tine 142' at about 85% of a revolution and returns the bar to its original full line position. This return action to the full line position takes place near the point designated by dotted arrow 13 with the direction of rotation indicated by the arrow on Figure 1b, and therefore returns wire 72 into the circuit just before contact 13 reaches plate 109.

When the direction of rotation of disc 111 is reversed so that it rotates in a clockwise direction (Figure 1b), the pin 143' will contact with tine 141' of bar 139 to rotate the bar from the full line position to the dotted line position to place wire 12 in the circuit at the position of contact 77 indicated by the dotted arrow 77', and on continued rotation of disc 111 when contact 13 reaches the position of the dotted arrow 13 (Figure 1b) pin 143 will engage tine 141 to rotate bar 139 again to the full line position thereby returning wire 72 into the circuit just after contact 77 passes plate 117.

As hereinbefore explained when the liquid level is such as to cause wires 12 and 72 to oscillate with the contacts 13 and 77 lying between the full line arrow 77' and dotted line arrow 77 in Figure 1b, a play of about ten per cent of a revolution is permitted without operating the automatic switch. As shown in Figure 6, the contact 77 and wire 72 are in the circuit at about the 115% position and rotation on the disc causes the switch bar 139 to shift to the dotted line position thus introducing contact 13 and wire 12 into the circuit. Now, should the rotation of the discs be reversed because of a decrease in liquid level the pin 143 is so located that it will not shift switch bar 139 back to the full line position until about the position of dotted arrow 13' at the 5% position is reached. Thus it will be seen there is a play of about 10% in the switch shifting action of pins 143 and 143'. When the contacts lie between the dotted arrow position 77' at 75% of a revolution and arrow 77 at 85% of a revolution a similar lag in switch action occurs.

In order to provide a snap action for making and breaking the switch contacts just described, a collar 160 is secured to the opposite end of the shaft 136, and an L-shaped rod or pin 161 is threadedly secured therein and held against turning by a suitable lock nut. The bent end 163 of the pin 161 and the shaft 136 cooperate with the pin 164 which is suitably secured to the extension 137 in the frame 100, and a tension spring 166 is connected between the end of the pin 164 and the end 163 of the pin 161. A stop pin 168 is secured to the extension of the frame and cooperates with the stop pins 169 and 170 secured to the collar 160 to limit turning of the shaft 136 to the angular distance therebetween.

It is apparent that when the points 164, 136 and 163 are in line the switch will be on dead center and in this position the spring 166 will be ineffective, but the slightest turning movement of the collar 160 will bring the point 163 out of line with the points 136 and 164 so that the spring will then act with a snap action to turn the shaft 136 in one direction or the other depending on the direction of rotation until either of the stop pins 169 or 170 abut against stop pin 168 to limit the turning movement. The initial rotation of the pin 163 to cross the dead center line is accomplished by the pin 143 contacting during the turning of discs 110 and 111 with one or the other of the tines 141 or 142 to swing the bar 139 about the shaft 136 to which it is secured as a pivot and once dead center has been passed the spring pulling on the pin 161 turns the shaft 136 to simultaneously open one set of the switch contacts, as for example, 66, 78, and close the other set 63, 64. Thus, the shaft 136 will always be in position with either stop pin 169 or 170 abutting stop pin 168 except when being moved by either pin 143 or 143' acting on bar 139.

A third disc 175 similar to discs 110 and 111 is secured to a sleeve 176 loosely journalled on the central shaft 103 so as to be rotatable independently thereof, and a gear wheel 177 likewise is secured to this sleeve. Longitudinal movement of the sleeve 176 on the shaft 103 is confined by the collars 178 and 179 suitably secured to the shaft. The sleeve 176 and disc 175 are rotated through gearing consisting of the pinion 180 secured to the end of the shaft 103 which rotates gear wheel 181 secured to a counter shaft 182 which has the pinion 183 thereon which meshes with the gear wheel 177 to rotate the latter. It will be apparent that by reason of the reduction gearing between discs 110 and 111 and disc 175 for each revolution of discs 110 and 111, disc 175 makes only a fraction of a revolution, depending on the reduction effected by the gearing. Reduction gearing can be employed to secure any desired ratio of revolutions between the discs 175, and 110, 111.

The sliding contact wire 22 is wound around the edge of the disc 175 and is clamped in place at its ends by a suitable plate 185 of non-conducting material suitably secured to the disc. One end 24 of the wire passes through the disc 175 and contacts with a collector ring 26 while a suitable auxiliary resistance 76 in the disc is interposed between the other end 25 and a collector ring 27. A spring pressed contact 23 insulated from the frame 100 makes sliding contact with the wire 22 during its travel. An abutment member 195 threadedly secured in the bottom portion of the frame 100 coacts with suitable stops 196 and 197 on the gear wheel 177 to limit rotation thereof and of the disc 175 in either direction so that the brush 23 will not contact plate 185. Spring brush members 28 and 29 suitably secured to the shelves 171 and 172 on the frame 100 and insulated therefrom resiliently bear on the collector rings 26 and 27 respectively, and have lead wires 57 and 59 secured thereto which at their other ends are secured to suitable binding posts. A suitable lead wire 61 connects the sliding contact 23 with a binding post.

Referring to Figure 7 the switch member S is located at one corner of the case 85 and is secured to the cover 86 in any suitable manner. This switch member comprises separate, movable contact members 53 and 50 secured to a shaft 211 adapted to make contact simultaneously with the fixed contacts 51 and 55 or with 52 and 54. Referring to Figure 1, it will be seen that when switch members 53 and 50 contact members 51 and 55 the receiver is connected to show the height of liquid in feet and when switch members 53 and 50 contact members 54 and 52 the receiver shows the height in inches. To eliminate the possibility of error by reading the wrong scale the inch scale is adapted to be covered when contact is made with switch elements 51 and 55, and when contact is made with the switch elements 52 and 54 the foot scale becomes covered. For this purpose the shaft 211 upon which the movable switch elements are mounted has secured thereto a cam member 212 which cooperates with a shutter 213 mounted upon a bell crank lever 214 suitably pivoted at 215 to the cover 86. It will be seen that when the switch elements 53 and 50 are moved to contact members 51 and 55 the cam 212 is shifted about with the shaft 211 to the dotted line position, and the weight of the bell crank lever 214 and shutter 213 moves the shutter down to a position to cover scale G leaving scale F visible through the opening or window 91 in the cover 90. In this position the disc 87 is rotated by the knob 89 until the galvanometer 36 registers zero at which point the reading of the scale is taken at the lowest full foot. The switch is then shifted to contact members 52, 54 whereupon the cam 212 rotates the bell crank lever to the left to uncover scale G and cover scale F as shown. The disc 87 is again rotated until galvanometer 36 registers zero position at which point the reading is taken on scale G. The sum of the readings of scale F and scale G gives the height of liquid in the tank.

Referring to Figure 1b, when the contact 77 lies at the position on wire 72 opposite end 14 and the receiving circuit is balanced, the scale G registers 12 inches. Upon movement of wire 72 in the direction of the arrow the contact 77 will in effect be moved clockwise and when the position indicated by the dotted arrow 77 is reached and the receiving circuit is balanced the receiver scale G will show about 1.8 inches on the red scale. A further slight turning of the wire 72 and the toggle switch breaks contact with 77 and makes contact with 13 thereby completely unbalancing the circuit. To reestablish the balance the receiver scale must be moved to the corresponding point on the black scale G, which will be about 1.8 inches.

As the transmitter continues to rotate in a counter-clockwise direction, the readings will increase on scale G until the transmitter reaches the point indicated by the dotted arrow 13 on Figure 1b. At or near this point the toggle switch of Figure 6 will assume its full line position as previously described to reinstate wire 72 of the transmitter in the balancing circuit but this action will be accomplished without a change in balance for the reason fully described in connection with Figure 1b, this point corresponding to about 10.2 inches on the black scale. However, the exact point at which this action occurs is not important because the change in the circuits involves no effect on the receiver.

The relationship of transmitter rotation in a reverse direction as the function to be measured decreases in value to the receiver scales, will be readily understood from the foregoing description of the manipulation of the receiver and the description of Figures 1 and 1b.

The toggle switch is so arranged as previously explained that the wires 12 and 72 can be rotated a considerable distance near the change over points without throwing the switch, so that after the switch is thrown a slight reverse rotation of the wires 12 and 72 will not immediately return the switch. This feature of operation is of particular value when a recording receiver is to be used.

Figures 8, 11:
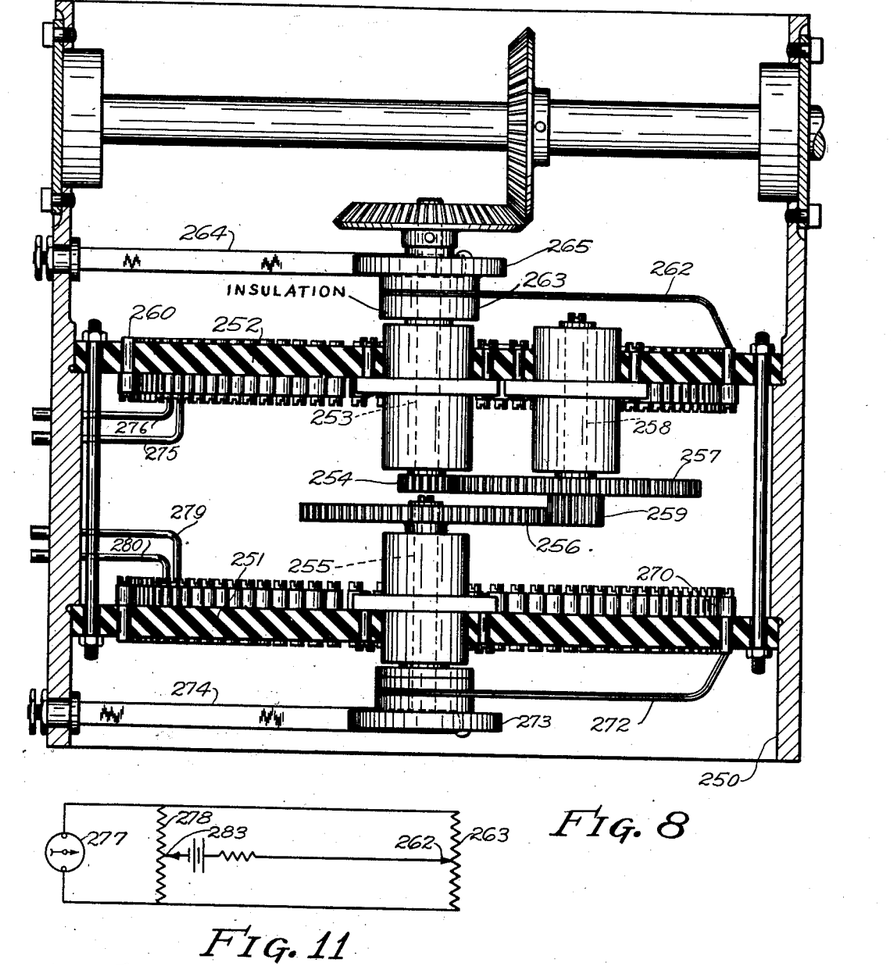
Figure 8 is a view in elevation, taken partly in section, of another preferred embodiment of the invention.
Figures 11, 12, 13 and 14 are schematic diagrams of preferred electrical circuits that may be employed as modifications.
Figure 9:
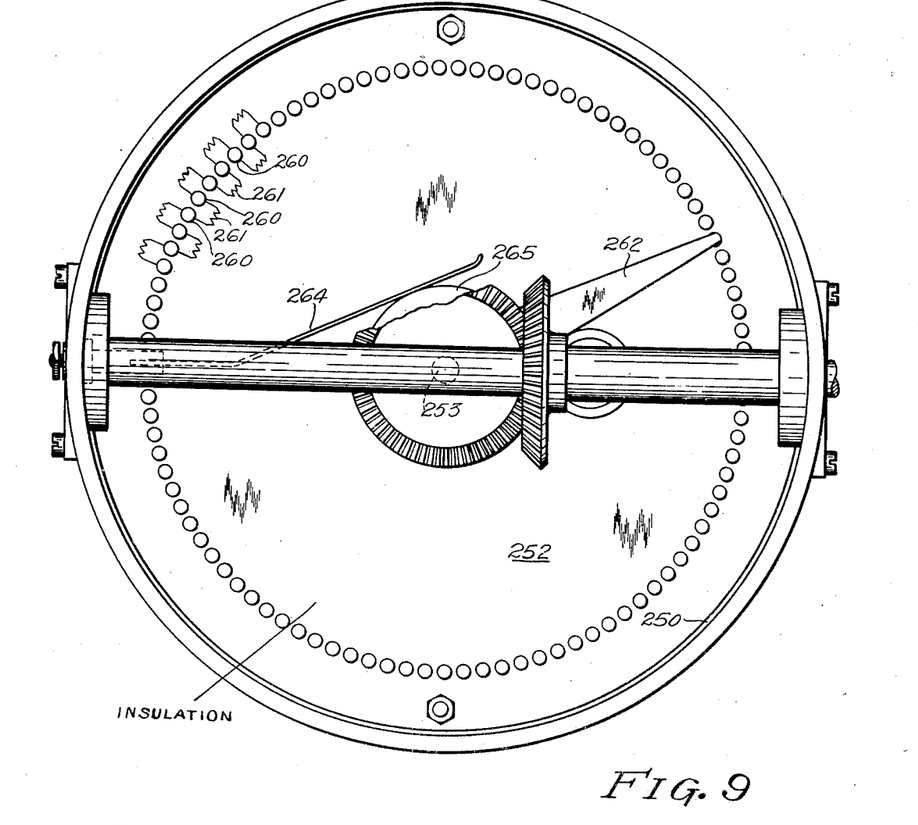
Figure 9 is a plan view of the embodiment of Figure 8.

In the modification shown in Figures 8 and 9 there is illustrated a suitable support 250 having two partitions or shelves therein 251 and 252 suitably secured in position. A shaft 253 passes through the upper partition 252 and has a pinion 254 on the lower end thereof while the shaft 255 suitably journalled in a lower partition, has the gear 256 on its end. Driving connection between the shafts 253 and 255 is established through the pinion 254, gear 257 mounted on a counter shaft 258 suitably journalled in the partition 252, and through the pinion 259 secured thereto, to the gear 256. In the modification shown a series of contacts 260 having suitable equal resistances 261 secured therebetween is mounted in the top partition 252 and corresponds in function with the slide wire 12 in the modification just described. A rotary contact member 262 suitably secured to the shaft 253 to rotate therewith, but insulated therefrom by a collar 263, is adapted to make sliding contact with the contacts 260, and a brush member 264, making sliding contact with a metal collar 265 in contact with the arm 262, is secured to the frame 250. On the bottom partition are mounted similar contacts 270 having resistances interconnecting the same, and a contact arm 272 is mounted on the shaft 255 and insulated therefrom. The contact 272 is electrically connected to a metal contact ring 273 mounted on the shaft 255 and a brush member 274 suitably secured in the frame 250 makes sliding contact therewith.

Figure 10:
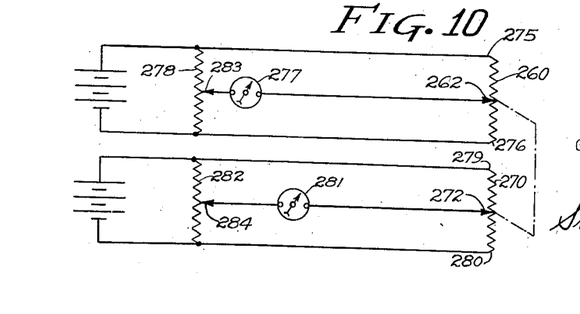
Figure 10 is a schematic diagram of an electrical circuit preferably employed in connection with the embodiment of Figure 8.

The operation of this modification will be apparent by consideration of Figure 10. The ends 275 and 276 of resistance 260 form part of an electrical circuit including a battery, and the sliding contact arm 262 makes sliding contact with the resistance 260 which conducts current through the brush 264 and galvanometer 277 to a resistance 278 equal to resistance 260. The resistance 270 likewise forms a part of an electrical circuit including a battery, the ends 279 and 280 of the resistance being connected in the circuit, and the contact member 272 making sliding contact with the resistance 270 being connected through the brush member 274 and galvanometer 281 with an equal resistance 282. The resistance 278 will be graduated in large units, and the resistance 282 will be graduated in fractional units. If it is desired to obtain the reading in the tank, the contact 283 is moved along the resistance 278 until the galvanometer shows zero deflection, and the graduations on the resistance are read to obtain the reading of the apparatus in feet. To obtain accurately the reading of the last fractional foot the contact 284 is moved along the resistance 282 until the galvanometer shows zero deflection and the reading of resistance 282 then is taken. The sum of the readings at 282 and 278 accurately give the reading of the level of liquid in a tank. If desired, the apparatus shown in Figures 8 and 9 can be used with the receiver shown in Figure 1.

Figure 11 shows a modification involving a different electrical circuit. In this modification the galvanometer 277 is shunted across the battery circuit and the sliding contacts 262 and 283 are connected in series in the battery circuit, that is the battery and galvanometer are interchanged from the modification shown in Figure 10. In this modification the reading is taken the same as in Figure 10, that is the sliding contact 283 is moved along the resistance 278 until the galvanometer shows zero deflection, and the reading then is taken. A similar modification would be employed for obtaining the reading in small units for the resistance 270.

Figure 12:
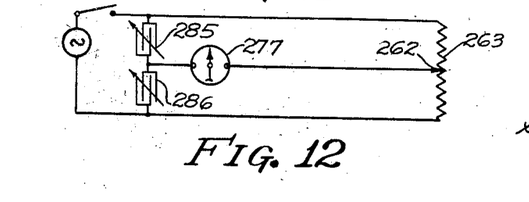

In the modification shown in Figure 12 the resistance 263 is balanced across a pair of variable capacitors 285, 286 which are manually varied until position of zero deflection in the galvanometer 277 is obtained. The reading of these capacitors then gives the liquid level in the tank.

Figure 13:
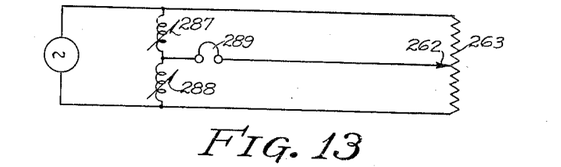

Figure 13 shows a modification employing alternating current. In this modification the resistance 263 is balanced across two variable inductances 287, 288 with an earphone 289 interposed in between, and the inductances 287, 288 are manually adjusted until humming in the earphone is eliminated whereupon they are read to show the level of liquid in the tank.

Figure 14:
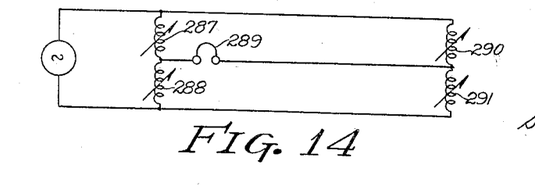

In Figure 14 is shown a schematic diagram of a modification in which two variable inductances 290 and 291 are balanced against two variable inductances 287, 288, with the earphone 289 in between, this system also employing alternating current. In this modification the inductances 290 and 291 are varied by the operation of the float in the tank and the inductances 287, 288 are manually adjusted until there is no humming in the earphone 289 whereupon the reading is taken. In all the modifications above described a similar circuit is employed for obtaining the reading in the small unit system.

In Figure 15 is diagrammatically shown a modification suitable for long distance transmission over telephone lines. In this modification the unit resistance wire 301 forms part of a potentiometer circuit having the battery 302 therein and connected thereto at its ends by lead wires 303 and 304. The wire 301 has a sliding contact 305 thereon adapted to be moved therealong by a float or similar actuating device and the sliding contact 305 is connected by a lead wire 306 to one terminal 307 of a relay 308. The purpose of this relay will be described hereinafter. The contact arm 311 of the relay is constructed to remain in a given position until actuated and as shown, the arm 311 closes contact with a lead wire 312 connected to a resistance 313 which in turn is connected to a lead wire 314 connected to contact 315 of a second similar relay 316. As shown the arm 317 of this relay connects to the lead wire 318 joined to a telephone wire 319. One end of resistance 301 is likewise connected by a lead wire 321 to a contact 322 of a similar relay 323 in which the arm 324 connects with the wire 325 connected to a telephone wire 326.

The receiver comprises a resistance 331 similar to resistance 301 and connected to the battery 332 through a variable resistance 333 and sliding contact 334 whereby the potential drop across wire 331 can be changed so as to equal the potential drop across wire 301. A sliding contact 335 is manually movable along wire 331 and is connected by the lead wire 336 to a single pole switch 337 which in turn is connected to a galvanometer 338 and by a lead wire 339 to telephone wire 319. The one end of wire 331 is connected by a lead wire 341 to telephone wire 326.

From the description so far pursued, it will be seen that the battery 302, resistance 301, connecting leads 303 and 304 and sliding contact 305 constitute a potentiometer circuit and that as the contact 305 is moved along wire 301 in response to changes in the level of liquid to be measured the potential between the ends of wire 301 and contact 305 is changed. The potential difference is conducted through wire 306, relay 308, wire 312 to relay 316, and through wire 318 to the telephone wire 319. From there it goes through wire 339 through galvanometer 338, switch 337 and lead wire 336 to contact 335 slidably engaging wire 331. The one end of wire 301 conducts the potential difference through wire 321, relay 323 and wire 325 to the other telephone wire 326, and from there through wire 341 to the corresponding end of wire 331. Initially the sliding contact 334 is set so that the potential drop across wire 331 is equal to the potential drop across wire 301 in a manner to be described. The galvanometer 338 will show zero deflection when sliding contact 335 is set at a position on wire 331 corresponding to the position of sliding contact 305 on wire 301. By means of a scale on wire 331 the height of liquid in the tank can be read in feet by the position of contact 335. A switch 342 can be employed for shunting the galvanometer to prevent injury thereto when closing relay switches 371 or 381 for throwing the relays as will be described hereinafter.

The fractional unit measuring device comprises a potentiometer circuit exactly like the unit device, and consists of a similar slide wire 351, battery 352, lead wires 353 and 354, and a sliding contact member 355. The sliding contact 355 is connected by a lead wire 356 to a contact 357 of the relay 358, and the arm 361 thereof is connected to a wire 362, resistance 363 and wire 364 to the other contact member 365 of relay 316. One end of wire 351 is connected by wire 366 to the contact 367 of relay 323.

In order to permit the use of a single receiving unit for both the unit and fractional unit device a system of relays is employed for cutting one of the units out of the circuit while a measurement is being made with the other unit. The relay system is also used in checking the transmitting potentiometer circuits against the receiving potentiometer circuit. As shown, the arms of relays 308, 316, 323 and 358 are in position for measurement of the liquid level in large units on wire 301. For shifting the relays to cut out wire 301 and introduce wire 351 into the transmitting circuit a relay shifting circuit is provided comprising a battery 370 connected to a double pole switch 371, one terminal of which is grounded. The one terminal of both relays 316 and 323 likewise is grounded. In one position of switch 371 the relay arms 317 and 324 will take the position shown closing contact between contact 315 and wire 318 of relay 316, and between contact 322 and wire 325 of relay 323. Then upon opening switch 371 the relay arms will remain in this position, and the unit transmitter will now be in the circuit. To cut out the unit transmitter and insert the fractional unit transmitter the double pole switch 371 is shifted to its other position thereby sending an actuating current through the system which throws the relay arms 317 and 324 to the dotted line position. In this position the potential difference in wire 351 is transmitted through relay 316 by arm 317 which closes contact between contact 365 and wire 318 to the telephone wire 319, and through relay 323 by arm 324 which closes contact between contact 367 and wire 325 to the telephone wire 326. At the same time by the relay arms 317 and 324 breaking contact with contacts 315 and 322 the unit transmitter is cut out of the circuit. By shifting the sliding contact 335 along wire 331 as hereinbefore described and by the use of a suitable fractional unit scale the reading of the fractional unit transmitter can be taken.

The following arrangement is employed for checking the transmitting and receiving circuits. The unit transmitter wire 301 makes a fixed connection with wire 375 which is connected to contact 376 of relay 308, and the receiver wire 331 likewise makes a fixed connection with wire 377 at a corresponding point thereon. Therefore the connections at 375 and 377 divide the respective slide wires 301 and 331 proportionally. In the position of the relays 316 and 323 shown it is necessary to employ a circuit for throwing the relay arm 311 into contact with contact 376. The circuit for this purpose comprises a battery 380 and a double pole switch 381 one pole of which is grounded. By throwing the switch 381 into one position the relay arm 311 is shifted to the dotted line position in which position the unit transmitter can be checked and contact 334 can be adjusted to the proper point. After checking, the switch 381 should be returned to measuring position to return the relay arm 311 to the full line position shown.

The fractional unit transmitter has a wire 385 similarly connected to the fractional unit resistance wire 351, and is connected to the contact 386 of the relay 358. To check the fractional unit transmitter the switch 371 is first thrown to actuate relays 316 and 323 and thereby cut out the unit transmitter from the circuit and cut in the fractional unit transmitter. The switch 381 is then thrown to actuate relay 358 and thereby shift the arm 361 to make contact between wire 362 and contact 386 whereupon the circuit can be checked as heretofore described. The resistances 313 and 363 are inserted to prevent the relay actuating current from being dissipated through the measuring circuit.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a tank gauge, a rotatable member having a circular resistance thereon, means operated by a motion to be measured for rotating said member, a stationary contact for contacting said resistance intermediate its ends, a guard for raising said contact to prevent contact at the ends of said resistance, a second member having a second circular resistance thereon and rotatable with said first member, the ends of said second resistance being disposed in angular relation to the ends of said first resistance, a second stationary contact for contacting said second resistance intermediate its ends, and a second guard for raising the second contact to prevent contact at the ends of the resistance, a switch, operating means for said switch to shift connection from one contact to the other when the respective guards break contact between the contacts and resistance, an electrical indicating circuit, and switch means for connecting said resistances into said indicating circuit.

2. In an apparatus of the character described, a rotatable disc, a ring conductor on said disc, a slide wire resistance secured about the periphery of said disc and having one end contacting with said ring conductor, a brush member making sliding contact with the exposed part of said resistance, a second disc movable in unison with the first disc, a second ring conductor thereon, an auxiliary resistance secured between the other end of the slide wire and the second ring conductor, a second slide wire secured about the periphery of the second disc and having one end contacting with the second ring conductor, a second auxiliary resistance equal to the first auxiliary resistance secured between the other end of the second slide wire and the first ring conductor, a second brush member making sliding contact with the exposed part of the second resistance, a balancing circuit including the ring conductor and means for disconnecting one or the other of said brush members from the respective slide wire resistances through a portion of the movement of said discs, and means operable while both brushes are engaging their respective slide wires to place one or the other of said brushes in the balancing circuit.

3. In a tank gauge, a rotatable member having a circular resistance thereon, means operated by a motion to be measured for rotating said member, a stationary contact for contacting said resistance intermediate its ends, a guard for raising said contact to prevent contact at the ends of said resistance, a second member having a second circular resistance thereon and rotatable with said first member, a second stationary contact for contacting said second resistance intermediate its ends, and a second guard for raising the second contact to prevent contact at the ends of the resistance, a switch, operating means for said switch to shift connection from one contact to the other when the respective guards break contact between the contacts and resistance, a third resistance element and a third contact adapted to contact said third resistance element, the third resistance element and the third contact being relatively movable and in synchronism at a predetermined different rate with the first and second named resistance elements and contacts, an electrical indicating circuit, and switch means for selectively connecting said resistance elements into said indicating circuit.

GARRETT B. LINDERMAN, Jr.